(No Model.)
J. MASON.
TREATMENT OF IRON OXIDES.
No. 307,667. Patented Nov. 4, 1884.
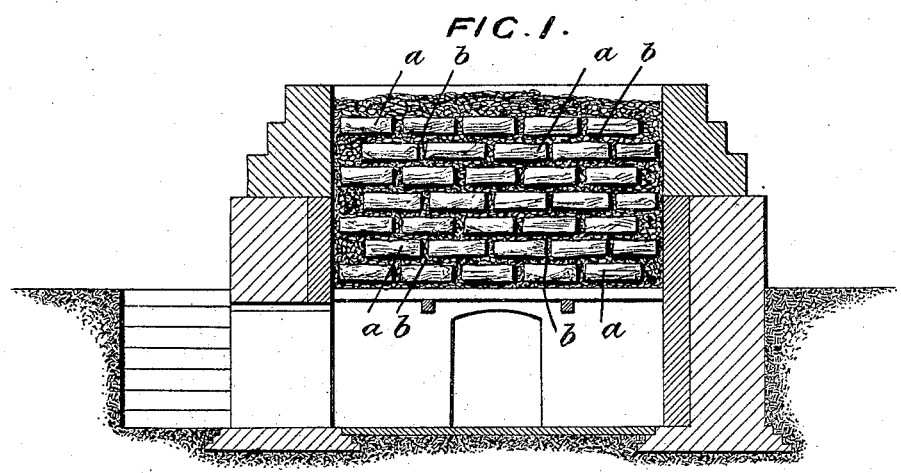
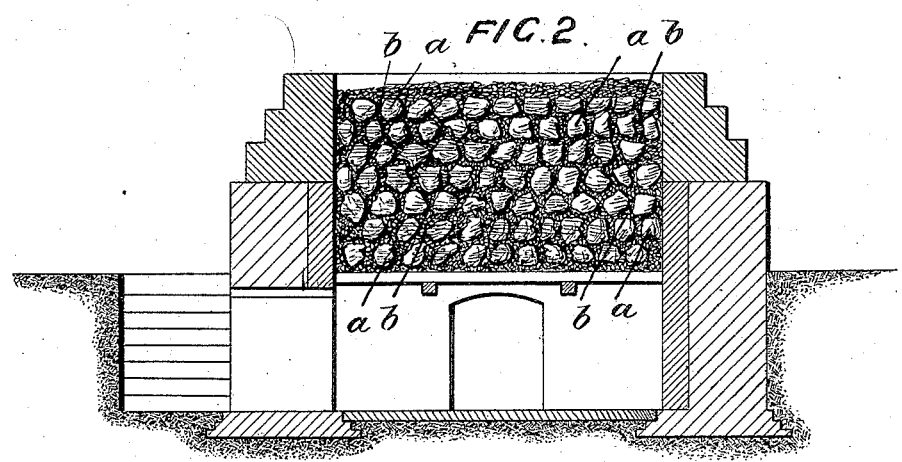
Witnesses:
Inventor:

UNITED STATES PATENT OFFICE.

JAMES MASON, OF EYNSHAM HALL, NEAR WITNEY, COUNTY OF OXFORD, ENGLAND.

TREATMENT OF IRON OXIDES.

SPECIFICATION forming part of Letters Patent No. 307,667, dated November 4, 1884.

Application filed July 28, 1884. (No model.) Patented in England June 6, 1884, No. 8,679.

*To all whom it may concern:*

Be it known that I, JAMES MASON, gentleman, a subject of the Queen of Great Britain and Ireland, and residing at Eynsham Hall, near Witney, in the county of Oxford, England, have invented certain improvements in the treatment of the oxides of iron obtained either from iron pyrites or from other sources, so as to render them more suitable for employment in the blast or other furnace, (for which I have obtained a patent in Great Britain, No. 8,679, dated June 6, 1884,) of which the following is a specification.

This invention relates to the treatment and use of certain oxides of iron resulting generally (but not always) from the burning and after treatment of cupreous iron pyrites for the production of sulphuric acid and the extraction of copper, whereby in most cases this residual oxide remains in a pulverulent form, and in other cases—as by my British Patent No. 2,993, 1877—it may be in the form of lumps, or as lumps and dust mixed together. Whenever this oxide is in a more or less pulverulent form it offers many difficulties as regards its use in the blast-furnace. These difficulties are not insuperable, as it may be formed into calcined bricks, although at a somewhat heavy cost.

This invention proposes to remedy the above difficulty in a cheap and simple manner.

This invention is founded on the fact that if the oxide in the forms mentioned above is placed as a thoroughly wet mass (molded or not) on a body of fuel, (which may or may not be already in a state of incandescence,) and is then surrounded and covered up by fuel, it will, while becoming red-hot as the fuel burns, retain for some time the form given to it, and will not break down into fragments or into dust, and as the heat increases to a full red it will become agglutinated, and will form a strong, cohesive, honeycombed mass.

Figure 1 of the accompanying drawings represents a section of a kiln charged with molded block, *a*, of oxide of iron, surrounded by or embedded in small coal or other suitable fuel, *b*, as hereinbefore described.

The wet mass of oxide, when to be molded, should by preference be very wet, in order that it may be readily moldable; it may with advantage contain as much as thirty per cent. of water.

In order to carry this invention into practice when it concerns the iron residue from cupreous iron pyrites, I take the wet oxide as it comes from the lixiviating-tanks or other place where its wetting has been effected, and I mold it in suitable molds, and then turn out the molded blocks of wet or moistened oxide from the said molds onto a layer of fuel (incandescent or not) in a kiln, which is open at the top. Then I cover the molded oxide with fuel, (small coal or breeze, for example,) so as to fill the interstices between the molded lumps. If the layer of fuel at the bottom of the kiln has not been in the first instance ignited, it should be ignited at this stage. As the ignition progresses upward and around the lumps of oxide and approaches the surface, another layer of molded oxide and fuel should be put on the top, and this continued until the kiln is filled to the top. The oxide and fuel are charged and allowed to burn upward in the manner described. Finally it should be allowed to "burn down," and the kiln and contents to cool. In cases where the oxide of iron, when wetted, does not hold together sufficiently well to retain its form when deposited from the mold on the hot fuel, I mix a small quantity of common plastic clay either with the oxide or with the water used for wetting the said oxide. I have found that so small a quantity as about from two to three per cent. of clay is sufficient for the purpose.

It is not absolutely necessary that the oxide be molded, as it may be wetted and put into the kiln without molding in the desired quantities by any suitable means—such as by means of shovels or barrows—as shown in Fig. 2, in which A represents the oxide, and *b* the surrounding fuel; but for the sake of economy of fuel and uniformity of action, I prefer the molding, which can be done roughly and at small cost.

It is not absolutely necessary that the burning operation be carried out in a kiln. For example, it may be done in heaps in the open air, much after the manner of burning clay for making railway-ballast, and this, under certain circumstances, may be the most convenient method.

I wish it to be understood that I do not confine myself to any precise form of kiln or arrangement in which the process of burning is to be carried on and effected, as either kilns, pits, or mounds or heaps may be adopted, my object being to effect the agglomeration of the finely-divided oxides and ores of iron by the employment of the means before mentioned, so as to render them more capable of being employed either in a blast or other furnace. The same method is applicable to several other forms of pulverulent iron ore or ores when in a state of division; but

What I claim is—

The herein-described improvement in treating oxides of iron, such as those resulting from the treatment of cupreous iron pyrites, preparatory to introduction of the same into the blast-furnace, said improvement consisting in molding or forming the said oxides into bricks, lumps, or masses by addition of water, and subjecting the same, while in a wet state, to the direct action of burning fuel, substantially as set forth.

In testimony whereof I have signed my name to this specification in the presence of two subscribing witnesses.

JAMES MASON.

Witnesses:
G. BAMP,
87 *Cannon Street, London, Chartered Accountant.*
GEO. HARVEY,
87 *Cannon Street, London, Commercial Clerk.*